US009137719B2

(12) United States Patent
Harris et al.

(10) Patent No.: US 9,137,719 B2
(45) Date of Patent: Sep. 15, 2015

(54) MULTI-FREQUENCY REAL-TIME DATA STREAM HANDOFF

(75) Inventors: David L. Harris, Pleasanton, CA (US); Walter F. Rausch, Shawnee, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1034 days.

(21) Appl. No.: 12/606,319

(22) Filed: Oct. 27, 2009

(65) Prior Publication Data

US 2011/0096754 A1 Apr. 28, 2011

(51) Int. Cl.
*H04W 36/02* (2009.01)

(52) U.S. Cl.
CPC ..................................... *H04W 36/02* (2013.01)

(58) Field of Classification Search
CPC .... H04W 36/023; H04W 36/30; H04W 36/32
USPC .......................................... 370/328, 331, 412
See application file for complete search history.

(56) References Cited

U.S. PATENT DOCUMENTS

| | | | |
|---|---|---|---|
| 5,528,283 A | 6/1996 | Burton | |
| 5,572,347 A | 11/1996 | Burton et al. | |
| 5,917,815 A | 6/1999 | Byers et al. | |
| 6,434,606 B1 | 8/2002 | Borella et al. | |
| 6,683,889 B1 | 1/2004 | Shaffer et al. | |
| 6,859,460 B1 | 2/2005 | Chen | |
| 7,006,511 B2 | 2/2006 | Lanzafame et al. | |
| 2005/0283447 A1* | 12/2005 | Xu et al. ....................... | 705/400 |
| 2006/0056383 A1 | 3/2006 | Black et al. | |
| 2006/0077994 A1 | 4/2006 | Spindola et al. | |
| 2006/0135074 A1* | 6/2006 | Petrovic et al. ............. | 455/67.13 |
| 2006/0251130 A1* | 11/2006 | Greer et al. ................... | 370/508 |
| 2007/0091848 A1 | 4/2007 | Karia et al. | |
| 2007/0177558 A1* | 8/2007 | Ayachitula et al. .......... | 370/338 |
| 2008/0045255 A1* | 2/2008 | Revel et al. ................... | 455/510 |
| 2008/0069065 A1* | 3/2008 | Wu et al. ....................... | 370/340 |
| 2008/0175238 A1* | 7/2008 | Venkatachalam ............. | 370/390 |
| 2008/0253333 A1* | 10/2008 | Hong et al. ................... | 370/331 |
| 2009/0191876 A1* | 7/2009 | Jain et al. ...................... | 455/437 |

* cited by examiner

*Primary Examiner* — Brandon Renner (57) ABSTRACT

A method of operating a communication system is disclosed. A time sensitive data stream is sent to a wireless device via a first wireless station. A handoff criteria is determined to have been satisfied. Based on the handoff criteria being satisfied, at least one control message is sent that instructs the wireless device to increase a buffer size associated with the time sensitive data stream.

12 Claims, 7 Drawing Sheets

MULTI-FREQUENCY REAL-TIME DATA STREAM HANDOFF

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of operating a communication system is disclosed. A time sensitive data stream is sent to a wireless device via a first wireless station. A handoff criteria is determined to have been satisfied. Based on the handoff criteria being satisfied, at least one control message is sent that instructs the wireless device to increase a buffer size associated with the time sensitive data stream.

A method of operating a wireless device is disclosed. A time sensitive data stream sent by a first wireless station is received at a wireless device. It is determined that a handoff criteria has been satisfied. Based on the handoff criteria being satisfied, the wireless device increases a buffer size associated with the time sensitive data stream.

A method of operating a communication system is disclosed. A time sensitive data stream is sent to a wireless device via a first wireless station. A handoff criteria is determined to have been satisfied. A message is sent to the first wireless station indicating that the handoff criteria has been satisfied. An indicator is sent to a second wireless station. This indicator is associated with a handoff of the wireless device from the first wireless station to the second wireless station. Based on the handoff criteria being satisfied, a buffer size associated with the time sensitive data stream is increased.

DETAILED DESCRIPTION

In an embodiment, a time sensitive or real-time data stream may be multicast to a wireless device. Examples of time sensitive data streams include audio and video data streams. These data stream may comprise real-time protocol (RTP) or real time control protocol (RTCP) packets. The device buffers part of this data stream before it is presented to the user of the wireless device. The time sensitive data stream is sent via a first wireless station when the wireless device is in the service area of that wireless station.

When the wireless device approaches an edge of the service area for the first wireless station, a handoff of the wireless device from the first wireless station to a second wireless station is determined to be likely. This likelihood may be expressed as a handoff condition. The second wireless station may not be broadcasting the multicast time sensitive data stream. The amount of the time sensitive data stream that is buffered is increased when the handoff condition is satisfied. This allows the wireless device to present the data stream without interruption during a handoff, scanning, and/or while the data stream is redirected to the second wireless station. When the handoff condition is no longer satisfied, either by handoff, or by the wireless device moving away from the edge of the service area, the buffer size may be reduced.

Figure 1:
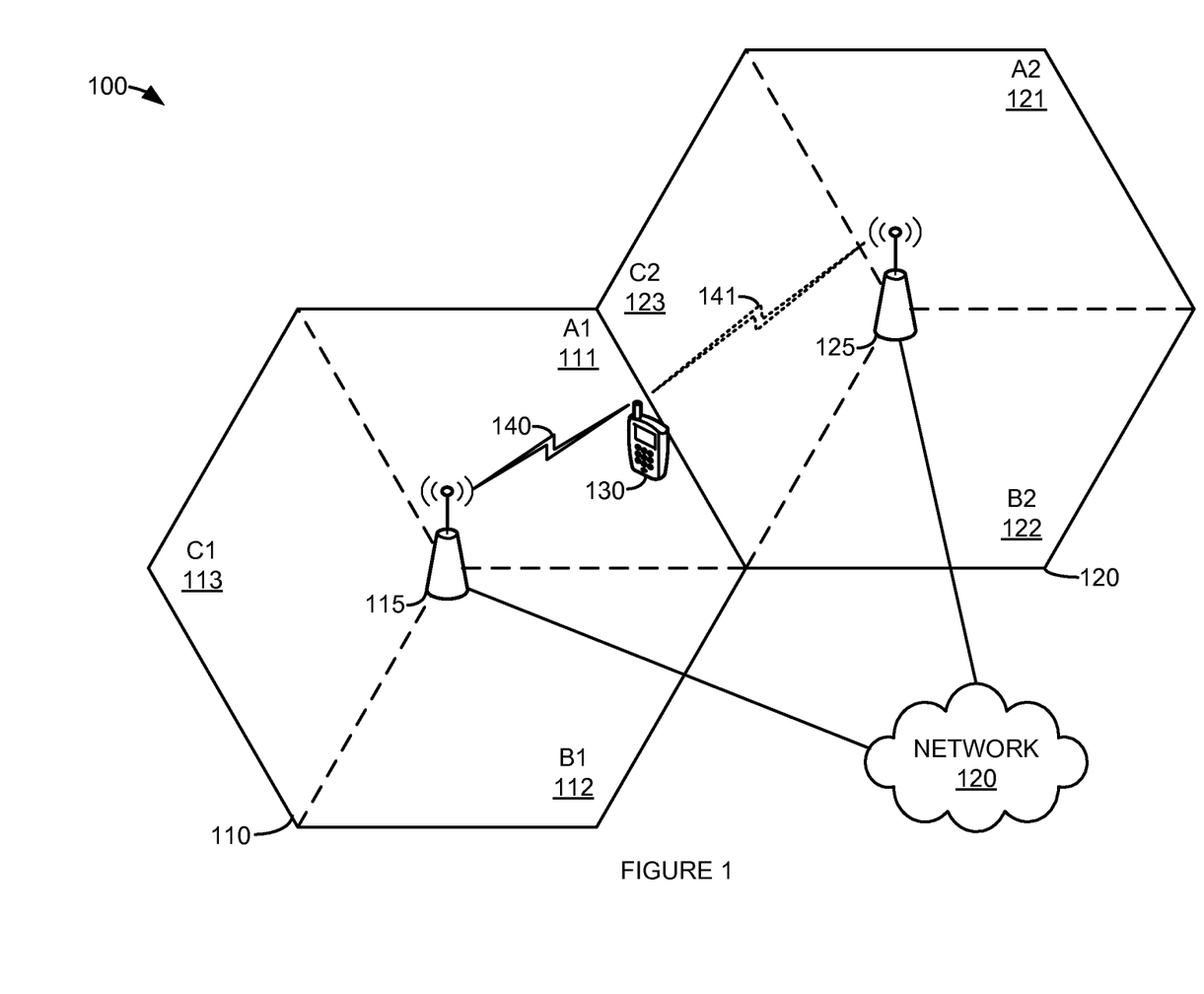
FIG. 1 is a block diagram illustrating a communication system.

FIG. 1 is a block diagram illustrating a communication system. In FIG. 1, communication system 100 comprises service area 110, service area 120, base station 115, base station 125, and wireless device 130. Base stations 115 and 125 may also be referred to as wireless stations. Base station 115 is operatively coupled to network 120. Base station 125 is operatively coupled to network 120. Wireless device 130 is operatively coupled to base station 115 via wireless link 140. Wireless device 130 may be coupled to base station 125 via wireless link 141. Thus, wireless device 130 may receive a time sensitive (e.g., real time audio and video) data stream from network 120 via base station 115 or base station 125.

Service area 110 comprises three sectors A1 111, B1 112, and C1 113. Service area 120 comprises three sectors A2 121, B2 122, and C2 123. Wireless device 130 receives a multicast time sensitive data stream from base station 115 via wireless link 140. Wireless device 130 is shown in sector A1 111 of service area 110.

In FIG. 1, service area 110 and service area 120 are shown as hexagons. Each sector 111-113 and 121-123 of service area 110 and service area 120, respectively, occupies one-third of a hexagon. The sectors in FIG. 1 are shown with the "A" sectors 111 and 121 in the upper right one-third of the service area 110 and 120, respectively. The "B" sectors 112 and 122 are shown in the lower right one-third of service area 110 and 120, respectively. The "C" sectors 113 and 123 are shown in the left one-third of service area 110 and 120, respectively. Also in FIG. 1, sector A1 111 and C2 123 are adjacent and share a common boundary.

Service area 110 illustrates the area serviced by base station 115. Sectors A1 111, B1 112, and C1 113 correspond to areas serviced by different frequencies transmitted from base station 115. Service area 120 illustrates the area serviced by base station 125. Sectors A2 121, B2 122, and C2 123 correspond to areas serviced by different frequencies transmitted from base station 125.

Sub-channels are allocations of frequency and time that base station 115 and base station 125 utilize to communicate with wireless device 130 and wireless device 131, respectively. For example, in a WiMAX specified system, transmissions are divided up into frames. Frames are allocations of transmission times. Each frame is further divided up into allocations of frequency and symbols. Symbols are an allocation of time that is less than a frame. A minimum unit of frequency and time that may be allocated in a frame of a WiMAX specified system may be referred to as a slot. In a WiMAX system, a sub-channel may be a particular allocation of one or more slots. The term "slot" may be applied to other wireless systems. In particular the term "slot" (meaning a unit allocation of frequency and time) may be used to describe the sub-channels of other systems that utilize orthogonal frequency-division multiple access (OFDMA).

Wireless device 130 may be any device, system, combination of devices, or other such communication platform capable of communicating a time sensitive data stream with base station 115 and base station 125 via wireless links 140 and 141, respectively. Wireless device 130 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 115 and base station 125 via wireless links 140 and 141. Other types of communication platforms are possible.

Base station 115 and base station 125 may be any wireless system that provides the air interface to wireless device 130. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Wireless links 140-141 uses the air, or space, as the transport media. Wireless links 131-134 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Network 120 may be any network or collection of networks that couple, link, or otherwise operatively connect base stations 115 and 125 with other devices or systems. Network 120 may include other secondary data networks. In an example, network 120 may include a backhaul network, a local network, a long distance network, a packet network, the internet, or any combination thereof, as well as other types of networks. Network 120 may comprise communication links that use metal, glass, air, space, or some other material as the transport media. These communication links could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. The communication links of network 150 could be direct links, or may include intermediate networks, systems, or devices.

In an example, network 120 may be, or include all or parts of an IEEE 802.16 (WiMAX) specified system. These parts may include additional base stations (BSs), an access services network (ASN), access services network gateway (ASN-GW), or connectivity service network (CSN).

In communication system 100, all "A" sectors may transmit on different frequencies than the "B" and "C" sectors (e.g., B1 111, B2 122, C1 113 and C2 123). All "B" sectors may transmit on different frequencies than the "A" and "C" sectors, and so on. Since an "A" sector is adjacent to a "B" sector and a "C" sector, choosing the frequencies to be different between any "A" sector and any "B" or "C" sector, results in reduced interference between adjacent sectors. However, this also means that when wireless device 130 is handed off between base stations 115 and 125, it must change frequencies to communicate with the adjacent base station.

In an embodiment, when wireless device 130 is receiving a time sensitive data stream and moves near the boundary of sector A1 111 and C2 123, a handoff criteria may be satisfied. For example, the signal to interference and noise ratio (SINR) or carrier to interference and noise ratio (CINR) received by wireless device 130 may fall below a specified threshold. In another example, the CINR or SINR associated with base station 115 by wireless device 130 may fall below the CINR or SINR, respectively, associated with base station 125. In another example, wireless device 130 may send an indicator of CINR, SINR, or other factors such as packet loss and/or packet error rate, to base station 115 or base station 125. These factors, or other factors associated with wireless device 130 may be used to determine an indicator associated with the likelihood of a handoff to base station 115 or base station 125.

In an embodiment, the handoff criteria may be based on an indicator of the likelihood of a handoff. Thus, satisfying the handoff criteria may not actually cause a handoff. Satisfying other criteria, or other thresholds, may be required to cause a handoff of wireless device 130 from base station 115 to base station 125. In addition, other indicators of the likelihood of a handoff, such as those based on the location of wireless device 130, may be used.

When the handoff criteria is satisfied, it indicates to communication system 100 that there is an increased likelihood of a handoff of wireless device 130 from base station 115 to base station 125. Based on the handoff criteria being satisfied, a control message may be sent that instructs wireless device 130 to increase the size of the buffer associated with the time sensitive data stream. Increasing the size of the buffer associated with the time sensitive data stream allows wireless device 130 to store more of the time sensitive data stream before it is presented to the user.

By storing additional time sensitive data in the buffer, wireless device 130 may continue to present data to the user during interruptions to the reception of the time sensitive data stream caused by activities associated with a handoff of wireless device 130 from base station 115 to wireless device 125. For example, wireless device 130 may stop receiving the time sensitive data stream from base station 115 in order to scan for base station 125. In another example, base station 115 and base station 125 may not be synchronized in the sending of the time sensitive data stream. In this case, as the handoff of wireless device 130 occurs, it may appear to wireless device 130 that the time sensitive data stream has "jumped ahead" or is repeating itself. Because the data being presented to the user is coming from the larger sized buffer, it helps wireless device 130 to continue to present the time sensitive data stream without disruption even when the data stream skips forward or backward.

After wireless device 130 has been handed off, or after the handoff criteria is no longer satisfied, a control message may be sent that instructs wireless device 130 to decrease the size of the buffer associated with the time sensitive data stream. Decreasing the buffer size associated with the time sensitive data stream conserves resources, such as memory space, within wireless device 130.

In an embodiment, wireless device 130 receives the time sensitive data stream sent by base station 115. Wireless device 130 may determine that a handoff criteria has been satisfied. Wireless device 130 may determine the handoff criteria has been satisfied as a result of wireless device 130 moving near the boundary of sector A1 111 and C2 123. For example, when wireless device 130 is near the boundary of a sector (e.g., A1 111) the SINR or CINR received by wireless device 130 from base station 115 may fall below a specified threshold. In another example, the CINR or SINR associated with base station 115 by wireless device 130 may approach within a threshold amount of the CINR or SINR, respectively, associated with base station 125. Based on a variety of other factors, such as packet loss or packet error rate, wireless device 130 may determine that a handoff criteria has been satisfied. Wireless device 130 may determine an indicator associated with the likelihood of a handoff to base station 115 or base station 125. This indicator associated with the likelihood of a handoff may be used to help determine whether the handoff criteria has been satisfied.

When the handoff criteria is satisfied, it indicates to wireless device 130 that there is an increased likelihood of a handoff of wireless device 130 from base station 115 to base station 125. Based on the handoff criteria being satisfied, wireless device 130 may determine to increase the size of the buffer associated with the time sensitive data stream. Increasing the size of the buffer associated with the time sensitive data stream allows wireless device 130 to store more of the time sensitive data stream before it is presented to the user.

As part of being handed off from base station 115 to base station 125, wireless device 130 may end its communication session with base station 115. Wireless device 130 may establish a new communication session with base station 125. After wireless device 130 has been handed off, or after the handoff criteria is no longer satisfied, wireless device 130 may determine to decrease the size of the buffer associated with the time sensitive data stream. Decreasing the buffer size associated with the time sensitive data stream conserves the resources, such as memory space, of wireless device 130.

Figure 2:
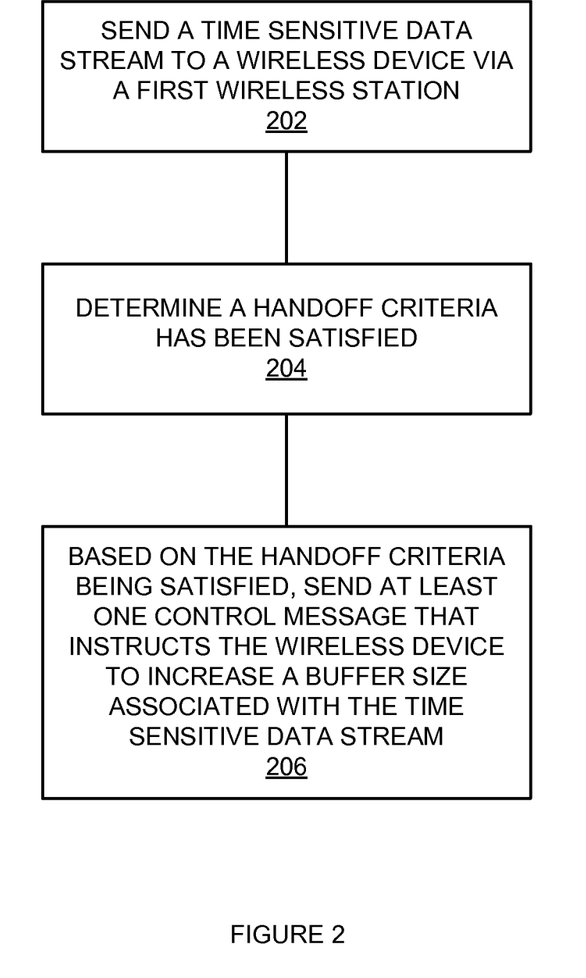
FIG. 2 is a flowchart illustrating a method of operating a communication system.

FIG. 2 is a flowchart illustrating a method of operating a communication system. The steps illustrated in FIG. 2 may be performed by one or more elements of communication system 100.

A time sensitive data stream is sent to a wireless device via a first wireless station (202). For example, a data stream associated with real-time audio and/or video may be sent to wireless device 130 via base station 115. This data stream may comprise RTP or RTCP packets.

A handoff criteria is determined to be satisfied (204). For example, base station 115 may determine that it is likely that wireless device 130 will be handed off to base station 125. Base station 115 may make this determination either alone or in concert with one or more of base station 115 and network 120. This determination may be based on CINR, SINR, or other factors and indicators such as packet loss and/or packet error rate, known or received by base station 115 or base station 125. In an example, the handoff criteria that is satisfied may be based on a calculated likelihood of a handoff. In another example, the handoff criteria that is satisfied may be based directly on CINR, SINR, or other factors and indicators such as packet loss and/or packet error rate, known or received by base station 115 or base station 125.

Based on the handoff criteria being satisfied, at least one control message is sent that instruct the wireless device to increase a buffer size associated with the time sensitive data stream (206). For example, based on a criteria associated with the likelihood of wireless device 130 being handed off from base station 115 to base station 125, base station 115 may send a message instructing wireless device 130 to increase the size of a buffer associated with a real-time data stream. In addition, based on the handoff criteria being satisfied, a message may be sent to base station 125 instructing it to start broadcasting the time sensitive data stream. In an embodiment, base station 125 may be instructed to start broadcasting (or multicasting) the time sensitive data stream only if it was not already broadcasting the time sensitive data stream.

Figure 3:
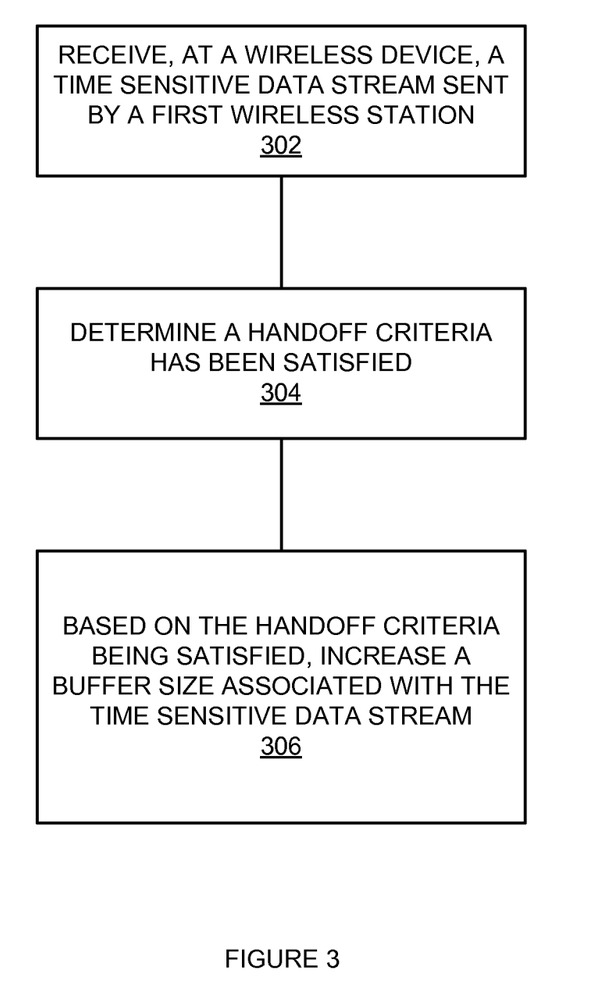
FIG. 3 is a flowchart illustrating a method of operating a wireless device.

FIG. 3 is a flowchart illustrating a method of operating a wireless device. The steps illustrated in FIG. 3 may be performed by one or more elements of communication system 100.

A time sensitive data stream sent by a first wireless station is received at a wireless device (302). For example, wireless device 130 may receive a real-time data stream from base station 115. This data stream may be associated with real-time audio and/or video and may be sent to wireless device 130 via base station 115. This data stream may comprise RTP or RTCP packets.

A handoff criteria is determined to have been satisfied (304). For example, wireless device 130 may determine that it is likely it will be handed off to base station 125. Wireless device 130 may make this determination either alone or in concert with one or more of base station 115, base station 125, and network 120. This determination may be based on CINR, SINR, or other factors and indicators such as packet loss and/or packet error rate, known or received by wireless device 130. In an example, the handoff criteria that is satisfied may be based on a calculated likelihood of a handoff. In another example, the handoff criteria that is satisfied by be based directly on CINR, SINR, or other factors and indicators such as packet loss and/or packet error rate, known or received by wireless device 130.

Based on the handoff criteria being satisfied, a buffer size associated with the time sensitive data stream is increased (306). For example, based on wireless device 130 determining it is likely to be handed off from base station 115 to base station 125, wireless device 130 may increase the size of an internal buffer associated with a real-time data stream. In addition, based on the handoff criteria being satisfied, wireless device 130, network 120, or base station 115 may send a message to base station 125 instructing it to start broadcasting the time sensitive data stream. In an embodiment, base station 125 may be instructed to start broadcasting (or multicasting) the time sensitive data stream only if it was not already broadcasting the time sensitive data stream.

Figure 4:
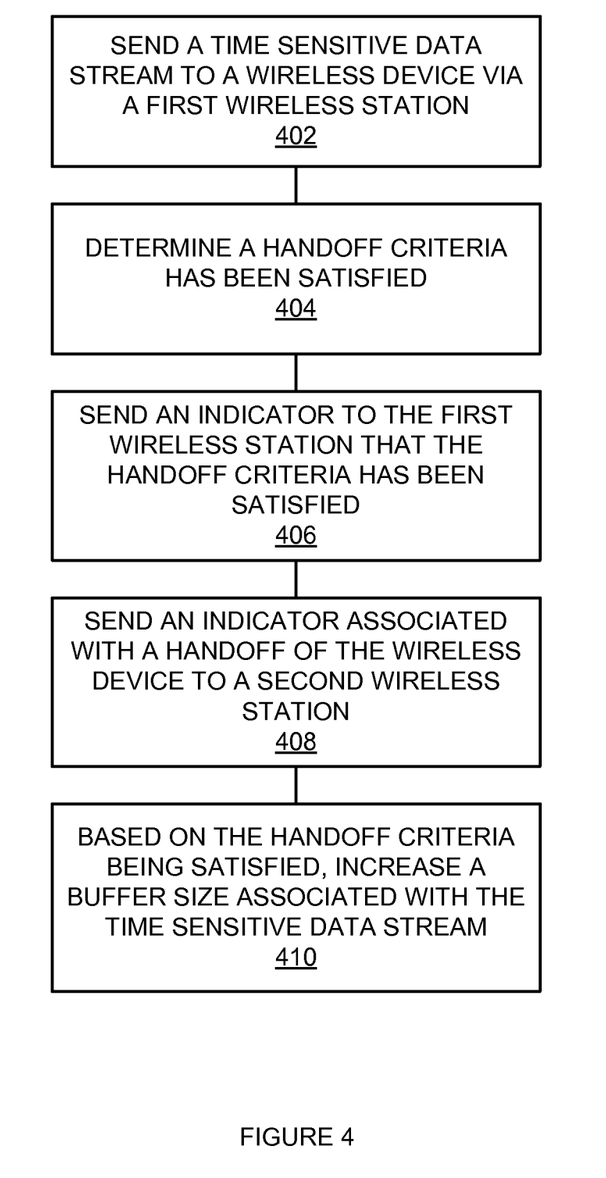
FIG. 4 is a flowchart illustrating a method of operating a communication system.

FIG. 4 is a flowchart illustrating a method of operating a communication system. The steps illustrated in FIG. 4 may be performed by one or more elements of communication system 100.

A time sensitive data stream is sent to a wireless device via a first wireless station (402). For example, a data stream associated with real-time audio and/or video may be sent to wireless device 130 via base station 115. This data stream may comprise RTP or RTCP packets.

A handoff criteria is determined to have been satisfied (404). For example, wireless device 130 may determine that it is likely it will be handed off to base station 125. Wireless device 130 may make this determination either alone or in concert with one or more of base station 115, base station 125, and network 120. This determination may be based on CINR, SINR, or other factors and indicators such as packet loss and/or packet error rate, known or received by wireless device 130. In an example, the handoff criteria that is satisfied may be based on a calculated likelihood of a handoff. In another example, the handoff criteria that is satisfied by be based directly on CINR, SINR, or other factors and indicators such as packet loss and/or packet error rate, known or received by wireless device 130.

An indicator that a handoff criteria has been satisfied is sent to the first wireless station (406). For example, wireless device 130 may send an indicator to base station 115. This indicator may be associated with wireless device 130's determination that the handoff criteria has been satisfied. This indicator may be associated with one or more of CINR, SINR, and other factors or indicators such as packet loss and/or packet error rate, known or received by wireless device 130. In an embodiment, base station 115 may use this indicator along with other criteria to determine an indicator of the likelihood that wireless device 130 will be handed off.

An indicator associated with a handoff of the wireless device is sent to a second wireless station (408). For example, base station 115 may send a message to base station 125. This message may initiate a handoff process. This message may be associated with the likelihood that wireless device 130 will be handed off from base station 115 to base station 125.

Based on the handoff criteria being satisfied, a buffer size associated with the time sensitive data stream is increased (410). For example, based on wireless device 130 determining it is likely to be handed off from base station 115 to base station 125, wireless device 130 may increase the size of an internal buffer associated with a real-time data stream. In addition, based on the handoff criteria being satisfied, wireless device 130, network 120, or base station 115 may send a message to base station 125 instructing base station 125 to start broadcasting the time sensitive data stream. In an embodiment, base station 125 may be instructed to start broadcasting (or multi-casting) the time sensitive data stream only if it was not already broadcasting the time sensitive data stream. As a result of receiving this message, base station 125 may allocate, or increase the size of, a buffer associated with the time sensitive data stream.

Figure 5:
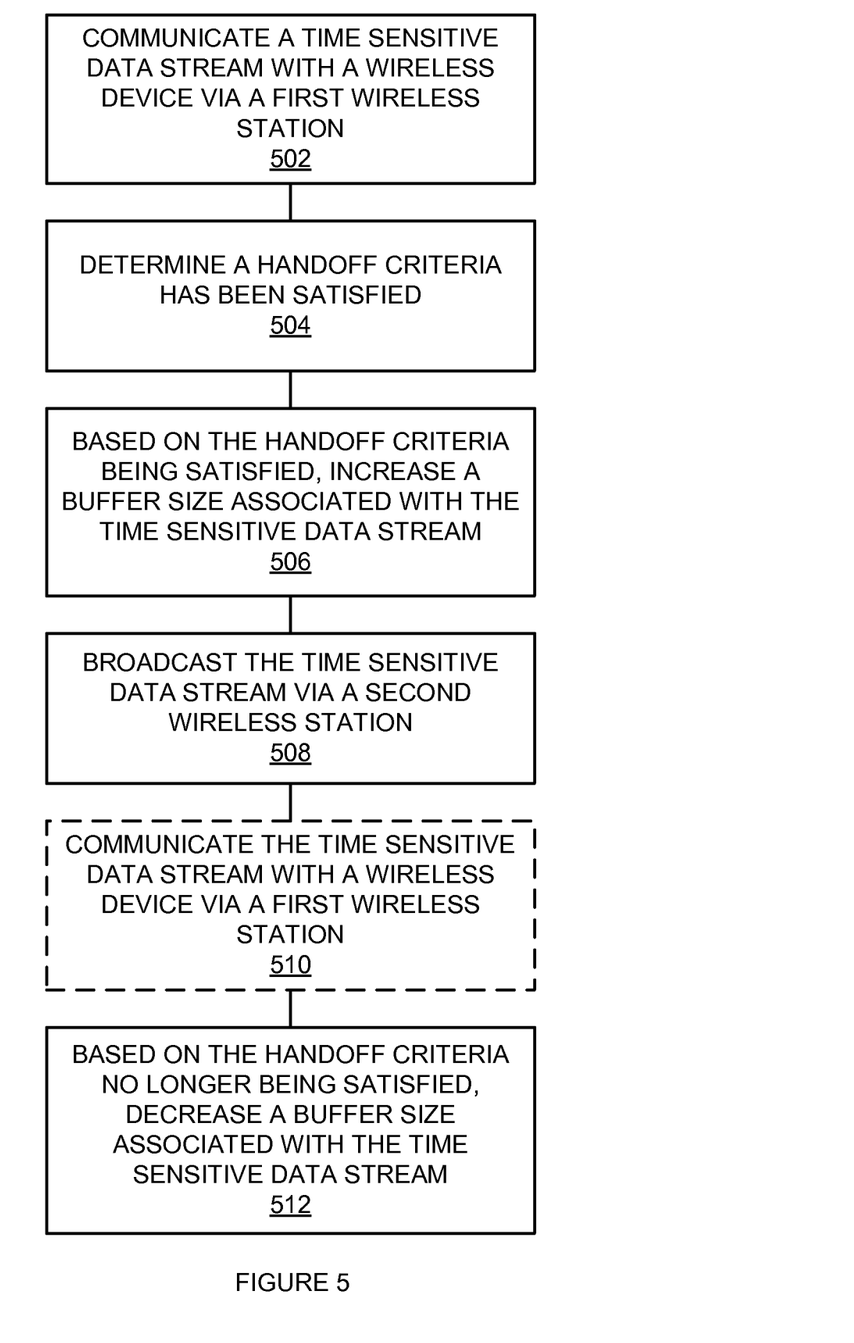
FIG. 5 is a flowchart illustrating a method of controlling a communication system.

FIG. 5 is a flowchart illustrating a method of controlling a communication system. The steps illustrated in FIG. 5 may be performed by one or more elements of communication system 100.

A time sensitive data stream is communicated with a wireless device via a first wireless station (502). For example, a data stream associated with real-time audio and/or video may be communicated to wireless device 130 via base station 115 using a multicasting protocol. This data stream may comprise RTP or RTCP packets.

A handoff criteria is determined to have been satisfied (504). For example, wireless device 130 may determine that a threshold condition associated with the likelihood it will be handed off to base station 125 has been satisfied. Wireless device 130 may make this determination either alone or in concert with one or more of base station 115, base station 125, and network 120. This determination may be based on CINR, SINR, or other factors and indicators such as packet loss and/or packet error rate, known or received by wireless device 130. In an example, the handoff criteria that is satisfied may be based on a calculated likelihood of a handoff. In another example, the handoff criteria that is satisfied may be based directly on CINR, SINR, or other factors and indicators such as packet loss and/or packet error rate, known or received by wireless device 130.

Based on the handoff criteria being satisfied, a buffer size associated with the time sensitive data stream is increased (506). For example, based on wireless device 130 determining it is likely to be handed off from base station 115 to base station 125, wireless device 130 may increase the size of an internal buffer associated with a real-time data stream. In an embodiment, base station 115 or base station 125 may allocate, or increase the size of, a buffer associated with the time sensitive data stream based on a handoff criteria being satisfied.

The time sensitive data stream is broadcast via a second wireless station (508). For example, wireless device 130, network 120, or base station 115 may send a message to base station 125 instructing base station 125 to start broadcasting the time sensitive data stream. In an embodiment, base station 125 may be instructed to start broadcasting (or multicasting) the time sensitive data stream if it was not already broadcasting the time sensitive data stream.

A time sensitive data stream is communicated with the wireless device via the first wireless station (510). In FIG. 5, this block is shown with a dashed line because it is an optional step. For example, block 510 would not be performed if wireless device 130 is handed off from base station 115 to base station 125. However, block 510 would be performed if wireless device 130 is not handed off from base station 115 to base station 125.

Based on the handoff criteria no longer being satisfied, a buffer size associated with the time sensitive data stream is decreased (512). For example, wireless device 130 may move away from the edge of the service area associated with base station 115. This may cause the handoff criteria to no longer be satisfied. In other words, one or more of CINR, SINR, or other factors and indicators such as packet loss and/or packet error rate, known or received by wireless device 130 may improve to an extent such that the handoff criteria is no longer satisfied. As a result of the handoff criteria no longer being satisfied, wireless device 130 may decrease a buffer size associated with the time sensitive data stream. In another embodiment, wireless device 130 may be instructed to decrease a buffer size associated with the time sensitive data stream as a result of the handoff criteria no longer being satisfied.

Figure 6:
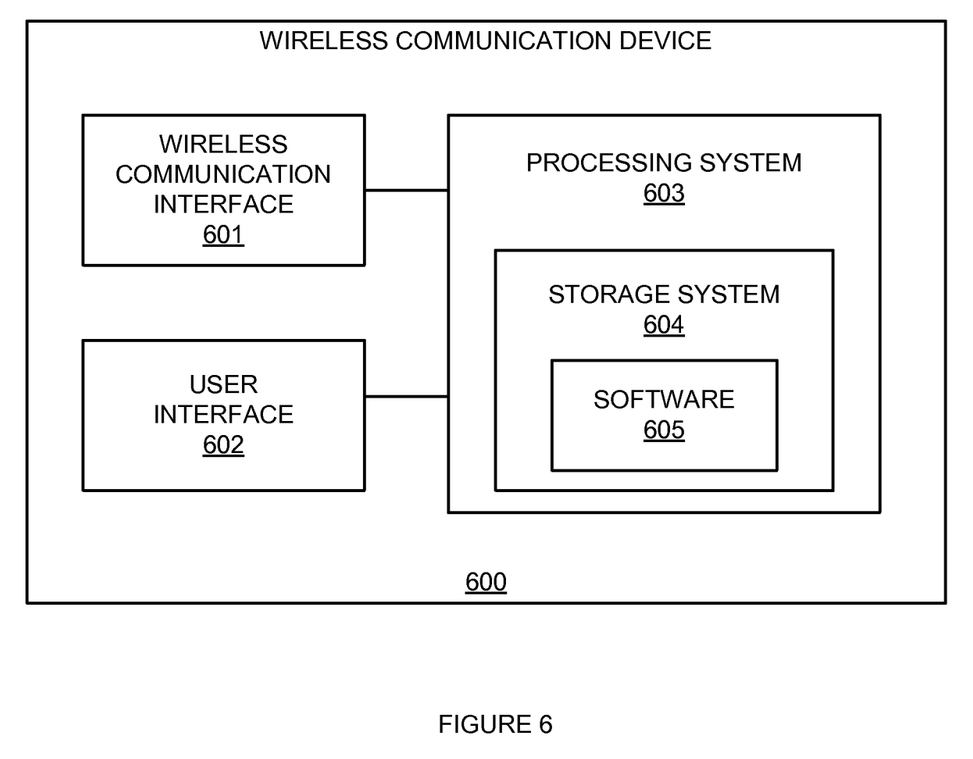
FIG. 6 is a block diagram of a wireless communication device.

FIG. 6 illustrates wireless communication device 600. Wireless communication device 600 is an example of wireless device 130, although wireless device 130 could use alternative configurations. Wireless communication device 600 comprises wireless communication interface 601, user interface 602, and processing system 603. Processing system 603 is linked to wireless communication interface 601 and user interface 602. Processing system 603 includes processing circuitry and storage system 604 that stores software 604. Wireless communication device 601 may include other well-known components such as a battery and enclosure that are not shown for clarity. Wireless communication device 600 may be a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device.

Wireless communication interface 601 may use various protocols, such as CDMA, EVDO, WIMAX, GSM, LTE, WIFI, HSPA, or some other wireless communication format.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing system 603 may comprise a microprocessor and other circuitry that retrieves and executes software 605 from storage system 604. Storage system 604 may comprise a disk drive, flash drive, data storage circuitry, or some other memory apparatus. Processing system 603 is typically mounted on a circuit board that may also hold storage system 604 and portions of wireless communication interface 601 and user interface 602. Software 605 comprises computer programs, firmware, or some other form of machine-readable processing instructions. Software 605 may include an operating system, utilities, drivers, network interfaces, applications, or some other type of software. When executed by processing system 603, software 605 directs processing system 603 to operate wireless communication device 600 as described herein.

Figure 7:
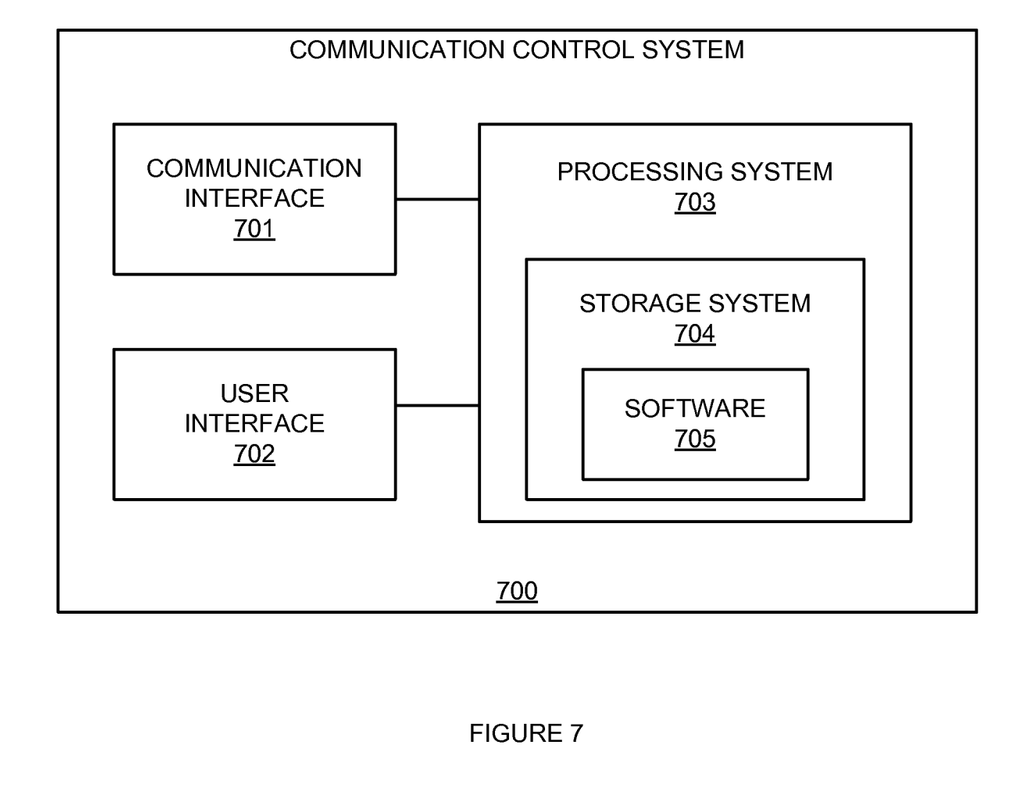
FIG. 7 is a block diagram of a communication control system.

FIG. 7 illustrates communication control system 700. Communication control system 700 may be an example of one or more components of communication system 100. This includes, but is not limited to base station 115, base station 125, and network 120, although these and other systems may use alternative configurations. Communication control system 700 comprises communication interface 701, user interface 702, and processing system 703. Processing system 703 is linked to communication interface 701 and user interface 702. Processing system 703 includes storage system 704 that stores software 705.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing system 703 may comprise a microprocessor and other circuitry that retrieves and executes software 705 from storage system 704. Storage system 704 may comprise a disk drive, flash drive, data storage circuitry, or some other memory apparatus. Software 705 comprises computer programs, firmware, or some other form of machine-readable processing instructions. Software 705 may include an operating system, utilities, drivers, network interfaces, applications, or some other type of software. When executed by processing system 703, software 705 directs processing system 703 to operate communication control system 700 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   transmitting, via a first wireless station using a first frequency, a time sensitive multicast data stream to a wireless device that is changing position relative to a sector boundary; and
   instructing the wireless device to increase an internal buffer size associated with the time sensitive multicast data stream when a handoff criteria is satisfied;
   interrupting a receipt of the time sensitive multicast data stream transmitted via the first wireless station at the wireless device and instructing the wireless device to scan for a second wireless station using a second frequency, wherein the second frequency is different from the first frequency;
   instructing the second wireless station to allocate a buffer associated with the time sensitive multicast data stream and broadcast the time sensitive multicast data stream using the second frequency; and,
   transmitting, via the second wireless station, the time sensitive multicast data stream to the wireless device and instructing the wireless device to decrease the internal buffer size associated with the time sensitive multicast data stream.

2. The method of claim 1, wherein the handoff criteria is based on at least one of an indicator of a likelihood of a handoff and an indicator of received signal strength.

3. The method of claim 1, further comprising:
   handing off the wireless device to the second wireless station.

4. The method of claim 3, further comprising:
   based on the handoff of the wireless device from the first wireless station to the second wireless station, sending at least one control message that instructs the second wireless station to decrease the buffer size associated with the time sensitive multicast data stream.

5. The method of claim 1, wherein the time sensitive multicast data stream is associated with a video data stream.

6. The method of claim 5, further comprising:
   based on the handoff criteria no longer being satisfied, sending at least one control message that instructs the wireless device to decrease the internal buffer size associated with the time sensitive multicast data stream.

7. A system for operating a wireless device, comprising:
   a controller configured to:
   transmit, via a first wireless station using a first frequency, receiving, at a wireless device, a time sensitive multicast data stream to a wireless device that is changing position relative to a sector boundary;
   increase an internal buffer size associated with the time sensitive multicast data stream at the wireless device when a handoff criteria is satisfied;
   interrupt a receipt of the time sensitive multicast data stream transmitted via the first wireless station at the wireless device;
   instruct the wireless device to scan for a second wireless station using a second frequency, wherein the second frequency is different from the first frequency;
   instruct the second wireless station to allocate a buffer associated with the time sensitive multicast data stream and broadcast the time sensitive multicast data stream using the second frequency; and, transmit, via the second wireless station, the time sensitive multicast data stream to the wireless device.

8. The system of claim 7, wherein the handoff criteria is based on an indicator of a likelihood of a handoff and an indicator of received signal strength.

9. The system of claim 7, wherein the controller is further configured to:

end a communication session with the first wireless station; and establish a second communication session with the second wireless station.

10. The system of claim 9, wherein the controller is further configured to:

based on establishment of the second communication session with the second wireless station, decrease, by the wireless device, the internal buffer size associated with the time sensitive multicast data stream.

11. The system of claim 7, wherein the time sensitive multicast data stream is associated with a video data stream.

12. The system of claim 11, wherein the controller is further configured to:

based on the handoff criteria no longer being satisfied, decrease, by the wireless device, the internal buffer size associated with the time sensitive multicast data stream.

* * * * *